(12) United States Patent
Lutz et al.

(10) Patent No.: US 9,839,205 B2
(45) Date of Patent: Dec. 12, 2017

(54) AIR-POWERED FILTER FOR AQUARIUM

(71) Applicant: Elive LLC, New Berlin, WI (US)

(72) Inventors: Thomas Lutz, Cedar Rapids, IA (US);
Matthew Allen, Waterford, WI (US);
Ernie Katris, New Berlin, WI (US);
Phillip Bartoszek, New Berlin, WI (US)

(73) Assignee: ELIVE LLC, Muskego, WI (US)

( * ) Notice: Subject to any disclaimer, the term of this patent is extended or adjusted under 35 U.S.C. 154(b) by 37 days.

(21) Appl. No.: 14/706,074

(22) Filed: May 7, 2015

(65) Prior Publication Data

US 2016/0324129 A1  Nov. 10, 2016

(51) Int. Cl.
*A01K 63/04* (2006.01)

(52) U.S. Cl.
CPC .......... *A01K 63/045* (2013.01); *A01K 63/042* (2013.01)

(58) Field of Classification Search
CPC ............................ A01K 63/045; A01K 63/042
USPC ........... 210/167.21, 167.26, 167.27; 119/261
See application file for complete search history.

(56) References Cited

U.S. PATENT DOCUMENTS

| | | | |
|---|---|---|---|
| 2,653,908 A | 9/1953 | Rodda | |
| 2,782,161 A | 2/1957 | Willinger et al. | |
| 3,643,801 A | 2/1972 | Zelenko | |
| 3,720,317 A | 3/1973 | Willinger | |
| 3,827,560 A | 8/1974 | Morton | |
| 4,206,054 A | 6/1980 | Moore et al. | |
| 4,820,556 A | 4/1989 | Goldman et al. | |
| 4,975,545 A | 12/1990 | Jones | |
| 5,306,421 A | 4/1994 | Weinstein | |
| 5,571,409 A | 11/1996 | Scarborough | |
| 6,332,430 B1 * | 12/2001 | Santa Cruz | A01K 63/006 119/253 |
| 6,352,051 B1 * | 3/2002 | Wang | A01K 61/17 119/248 |
| 6,461,122 B1 * | 10/2002 | Huang | A01K 63/047 119/253 |
| 2006/0113230 A1 * | 6/2006 | Carley | A01K 63/045 210/167.21 |

FOREIGN PATENT DOCUMENTS

EP             1606996 A1 * 12/2005

* cited by examiner

*Primary Examiner* — Fred Prince
(74) *Attorney, Agent, or Firm* — Michael Best & Friedrich LLP

(57) ABSTRACT

An air-powered filter for an aquarium includes a base component configured to be coupled to a surface of the aquarium, the base component including a suction cup. The air-powered filter also includes a filter component releasably coupled to the base component, the filter component including a filter housing having at least one opening. The air-powered filter also includes a decorative feature coupled to the base component, the decorative feature configured to cover and disguise at least a portion of the air-powered filter.

20 Claims, 7 Drawing Sheets

AIR-POWERED FILTER FOR AQUARIUM

FIELD OF THE INVENTION

The present invention relates to filters, and specifically to filters for use in aquariums.

BACKGROUND

Residential aquarium-keeping is an established industry in the United States and around the world. The most basic version of an aquarium includes a transparent container through which to view aquatic life. These containers are typically constructed of either glass or a transparent plastic material. To maintain certain aquatic life within an aquarium, oxygenation is often provided through the use of a filter.

SUMMARY

In accordance with one construction, an air-powered filter for an aquarium includes a base component configured to be coupled to a surface of the aquarium, the base component including a suction cup. The air-powered filter also includes a filter component releasably coupled to the base component, the filter component including a filter housing having at least one opening. The air-powered filter also includes a decorative feature coupled to the base component, the decorative feature configured to cover and disguise at least a portion of the air-powered filter.

In accordance with another construction, an air-powered filter for an aquarium includes a base component configured to be coupled to a surface of the aquarium, the base component including a suction cup and a décor attachment element coupled to the suction cup. The décor attachment element includes at least one prong configured to couple to a decorative feature. The air-powered filter also includes a filter component releasably coupled to the base component, the filter component including an air receiving element having a nozzle to receive air from an air source, and a filter housing coupled to the air receiving element, the filter housing having at least one opening.

Other aspects of the invention will become apparent by consideration of the detailed description and accompanying drawings.

Figure 1:
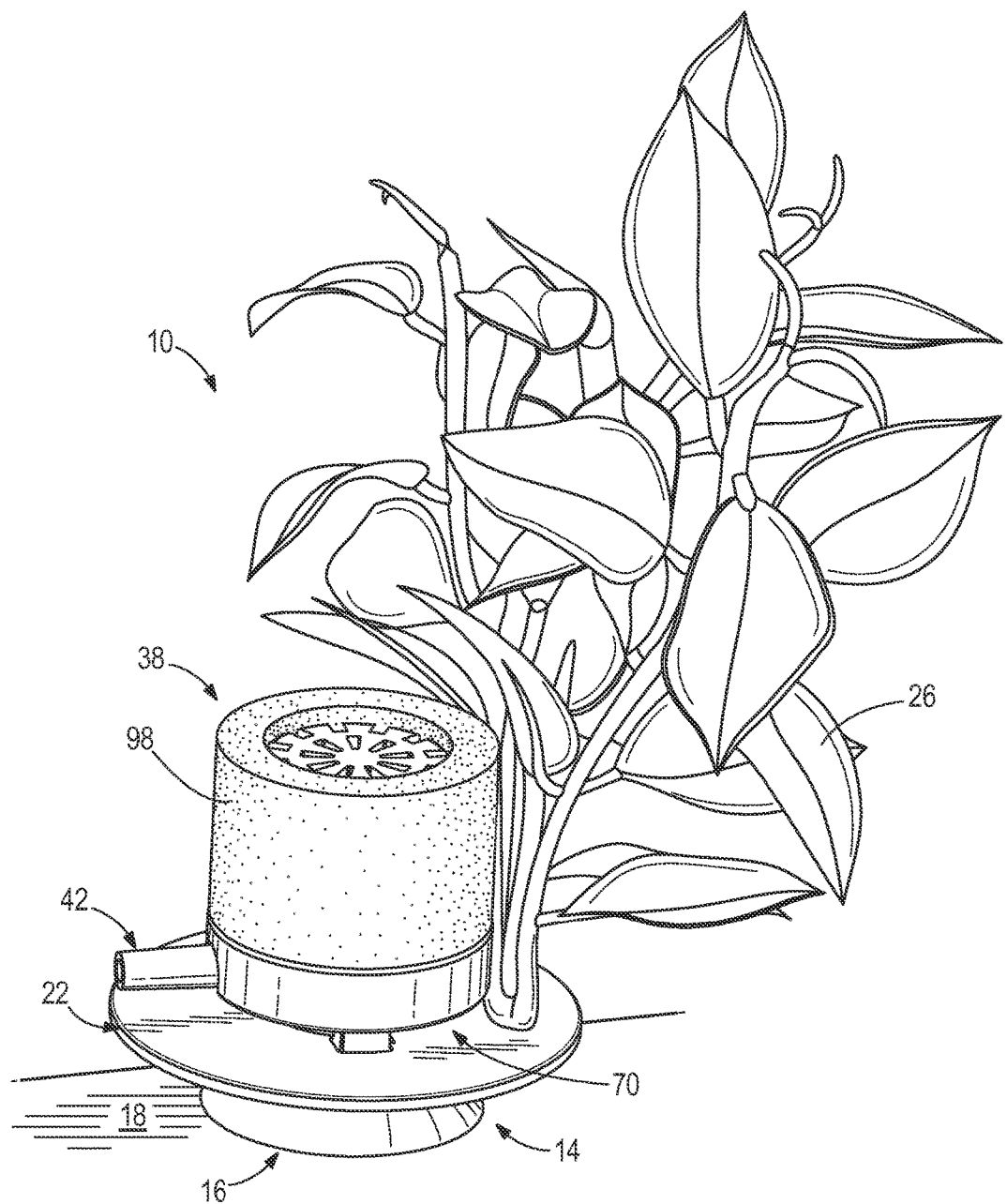
FIG. 1 is a perspective view of an air-powered filter for use in an aquarium, including a decorative feature to disguise at least a portion of the air-powered filter.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-13 illustrate an air-powered filter 10. As illustrated in FIGS. 1-8, the air-powered filter 10 includes a base component 14 for coupling the air-powered filter 10 to a surface 18 (FIGS. 1-6). In some constructions the surface 18 is the inside surface of a bottom wall of an aquarium, the inside surface of a side wall of an aquarium, or any other location where use of the air-powered filter 10 may be desirable. In the illustrated construction the base component 14 includes a suction cup 16 that allows the air-powered filter 10 to be removably coupled to the surface 18, so that the air-powered filter 10 may be moved from one location on the surface 18 to another, moved to a different surface, or be replaced. Other constructions include more than one suction cup 16, or include different types of base components 14 other than that illustrated.

Figure 3:
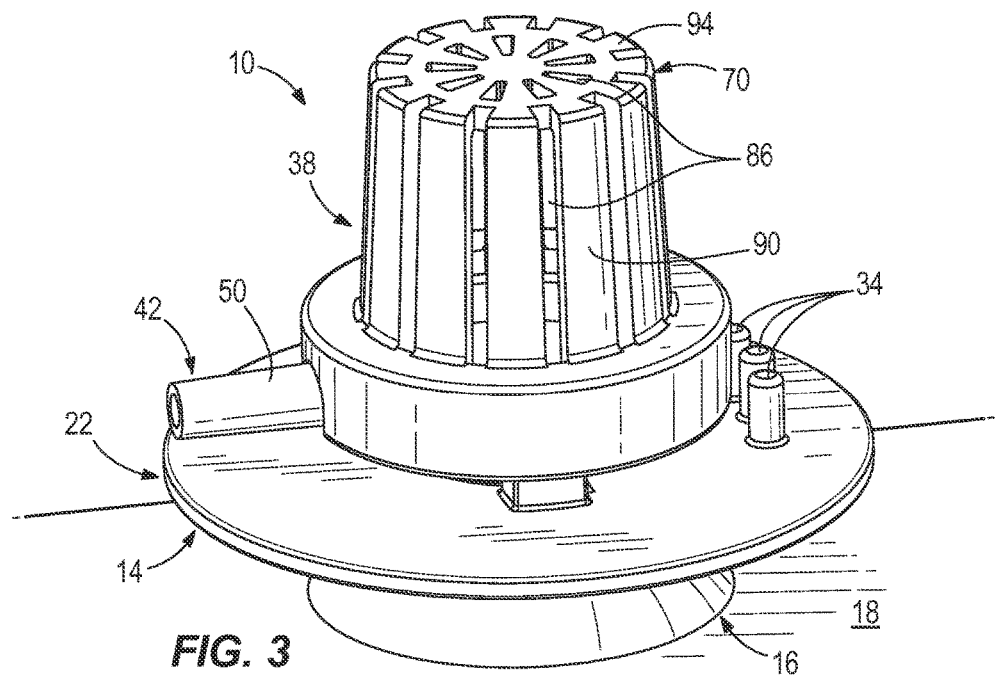
FIG. 3 is a perspective view of the air-powered filter, illustrating the base component, the décor attachment element, the air receiving element, and the filter housing.
Figure 4:
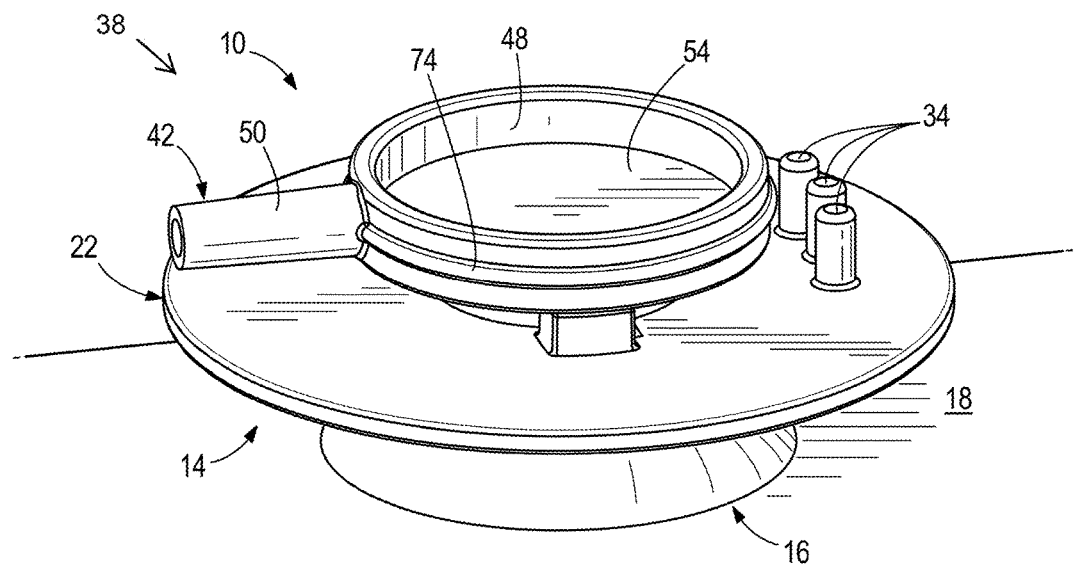
FIG. 4 is a perspective view of the air-powered filter, illustrating the base component, the décor attachment element, and the air receiving element.
Figure 5:
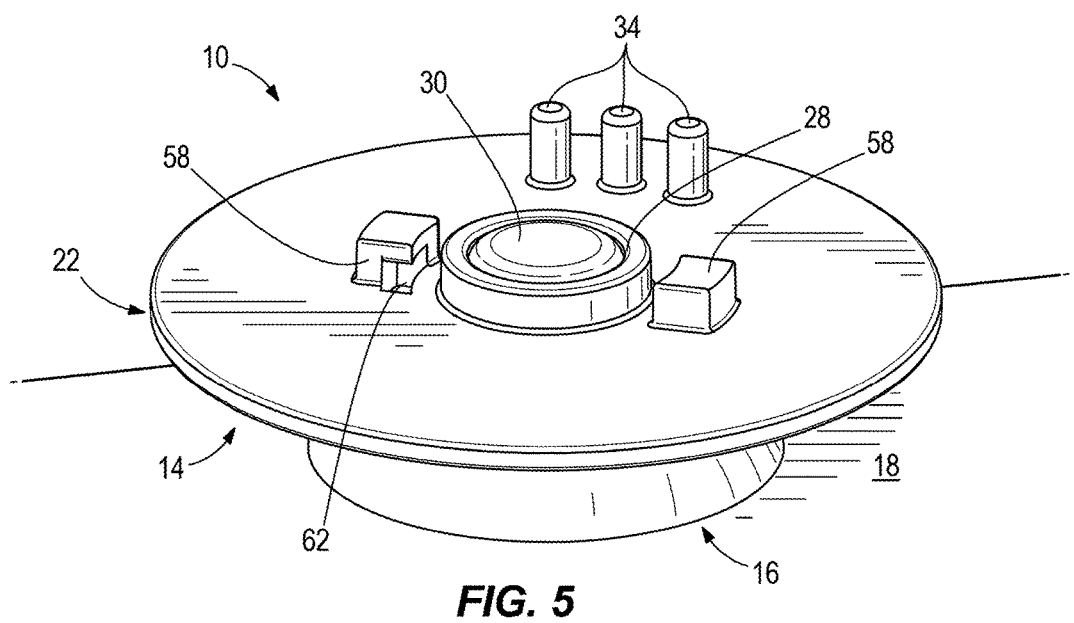
FIG. 5 is a perspective view of the air-powered filter, illustrating the base component and the décor attachment element.
Figure 6:
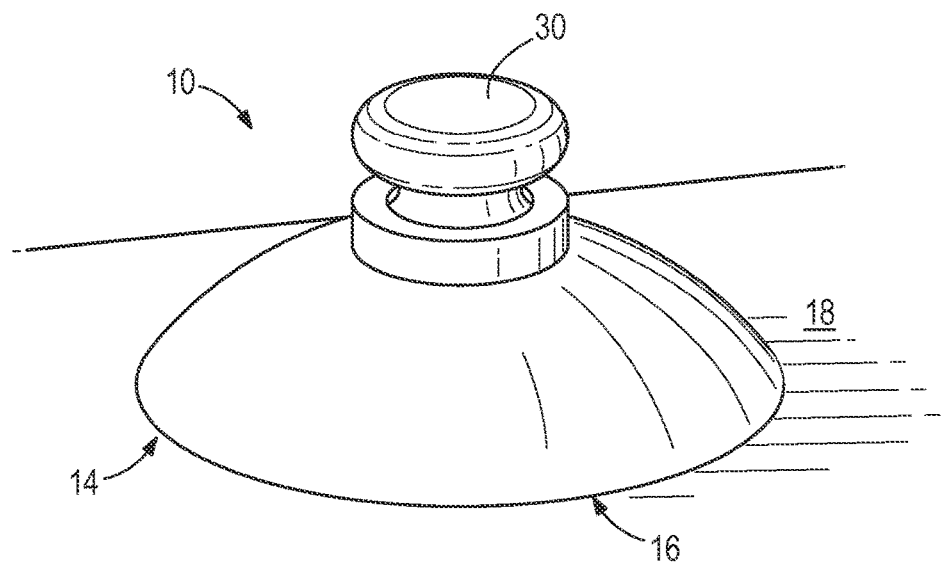
FIG. 6 is a perspective view of the air-powered filter, illustrating the base component.
Figure 7:
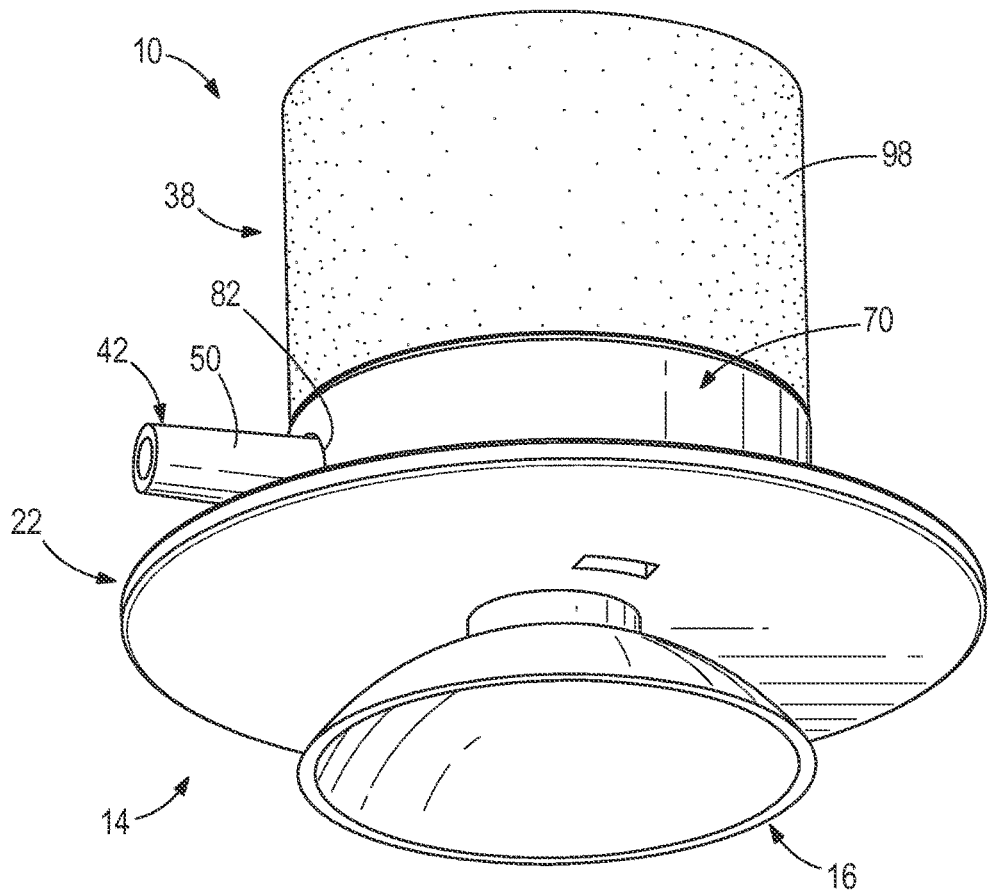
FIG. 7 is a perspective view of the air-powered filter, illustrating the base component, the décor attachment element, the air receiving element, the filter housing, and the outer housing.
Figure 8:
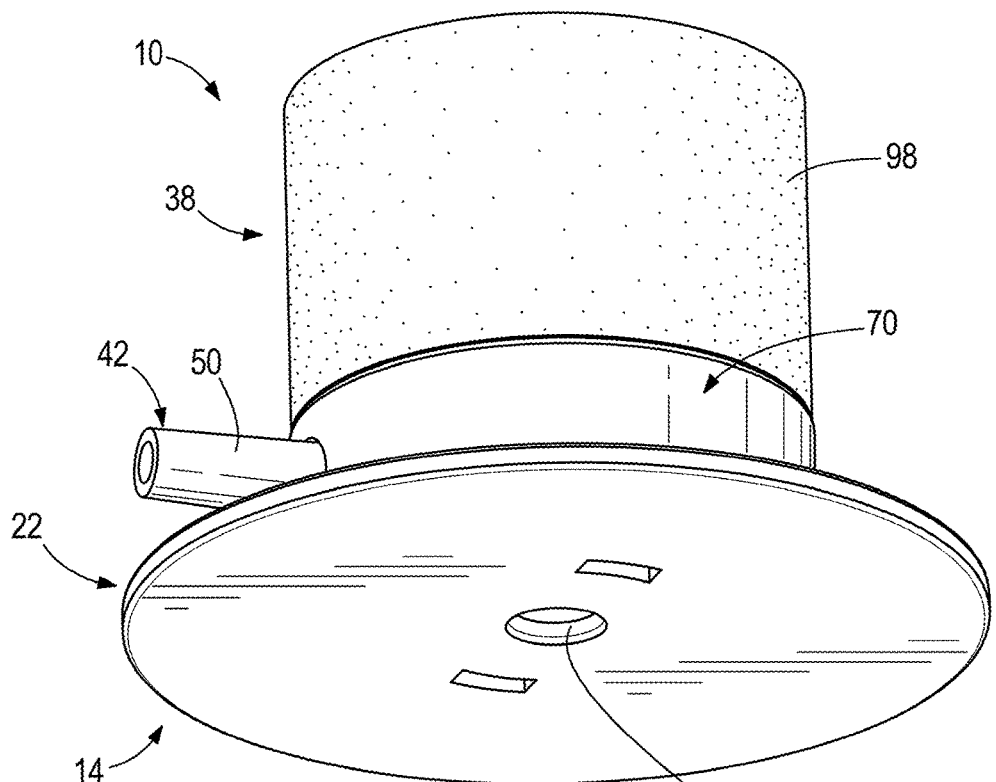
FIG. 8 is a perspective view of the air-powered filter, illustrating the décor attachment element, the air receiving element, the filter housing, and the outer housing.

With reference to FIGS. 1-5, 7, and 8, the base component 14 further includes a décor attachment element 22 that is used to couple a decorative feature 26 (FIG. 1) to the décor attachment element 22. With reference to FIGS. 5 and 8, in the illustrated construction the décor attachment element 22 includes an opening 28 that receives a top portion 30 of the suction cup 16 (e.g., via frictional fit or snap-in fit), so that the décor attachment element 22 is releasably coupled to the suction cup 14. In other constructions the décor attachment element 22 is integrally formed in a single piece with the suction cup 16. As illustrated in FIGS. 2-5, the décor attachment element 22 also includes a set of prongs 34. As illustrated in FIG. 1, the decorative feature 26 may be an artificial plant, or any other decorative feature, that sits over and engages (e.g., via frictional fit) the prongs 34. In the illustrated construction the decorative feature 26 is releasably coupled to the prongs 34 so that the decorative feature 26 may be removed from the décor attachment element 22. In other constructions the decorative feature 26 is integrally formed as a singled piece with the décor attachment element 22 or with any other portion of the air-powered filter 10.

With reference to FIGS. 1-4 and 7-9, the air-powered filter 10 further includes a filter component 38 coupled to the base component 14. In the illustrated construction the filter component 38 is releasably coupled to the base component 14 so that the filter component 38 may be removed and cleaned or replaced with a different filter component 38, without having to remove or replace the base component 14. In other constructions the filter component 38 is integrally formed as a single piece with the base component 14.

Figure 2:
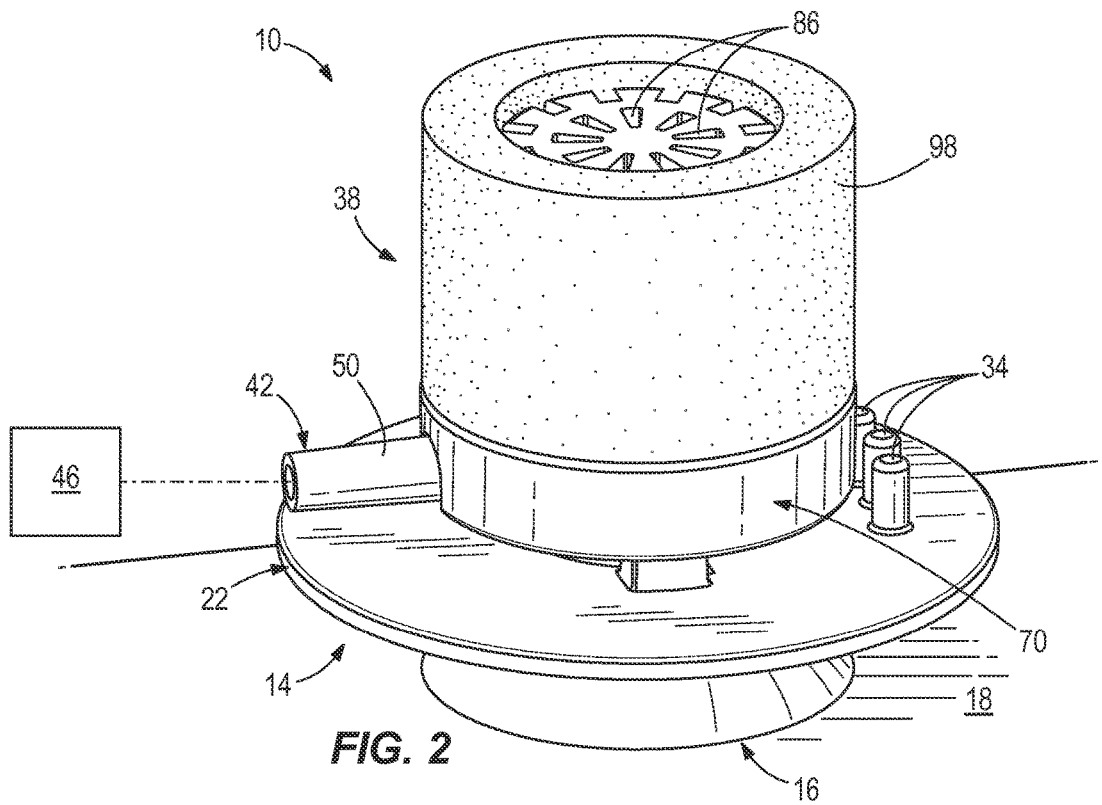
FIG. 2 is a perspective view of the air-powered filter, illustrating a base component, a décor attachment element, an air receiving element, a filter housing, and an outer housing.

With continued reference to FIGS. 1-4 and 7-9, the filter component 38 includes an air receiving element 42 that receives air (e.g., via a tube) from an air source 46 (illustrated schematically in FIG. 2). The air source 46 may be an ambient air source or another air source. The air receiving portion 42 includes a main body 48 (FIGS. 4 and 9), a nozzle 50 extending from the main body through which air enters the main body 48, and an open cavity 54 (FIG. 4) in the main body 48 that receives the incoming air from the nozzle 50, such that the nozzle 50 is in fluid communication with the cavity 54. In some constructions the nozzle 50 is a separate piece that is releasably coupled to the main body 48. While the illustrated construction includes the air receiving element 42 as part of the filter component 38, in some constructions the air receiving element 42 instead forms part of the base component 14. For example, in some constructions the air receiving element 42 is integrally formed as a single piece with the décor attachment element 22.

Figure 9:
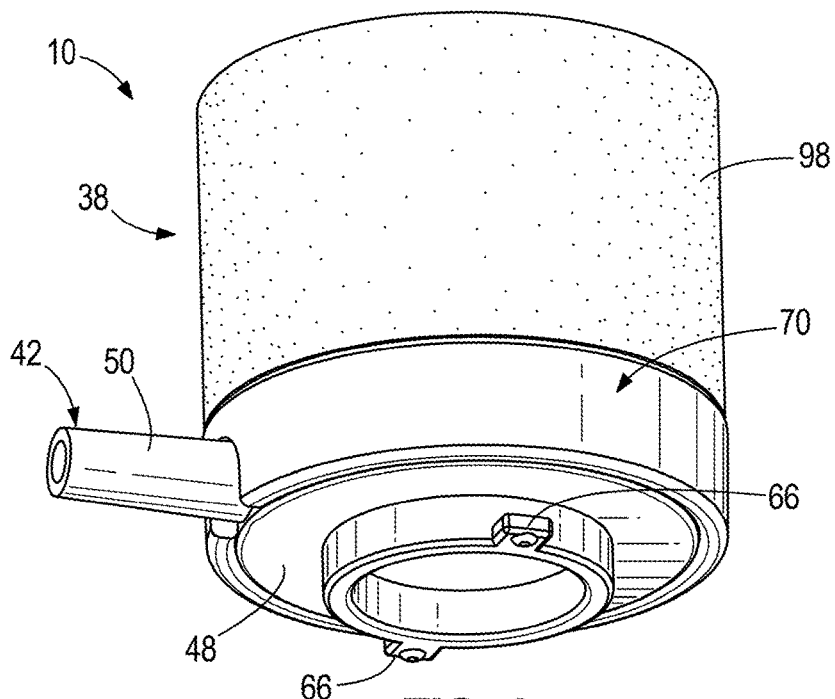
FIG. 9 is a perspective view of the air-powered filter, illustrating the air receiving element, the filter housing, and the outer housing.

With reference to FIGS. 5 and 9, in the illustrated construction the air receiving element 42 is releasably coupled to the décor attachment element 22. For example, as illustrated in FIG. 5, the décor attachment element 22 includes two, raised, axially extending projections 58 radially offset from the opening 28 that each form a channel 62 (one shown in FIG. 5). As illustrated in FIG. 9, the air receiving element 42 includes two radially extending projections 66. The radially extending projections 66 are configured to engage and disengage with the channels 62, to provide a bayonet-type connection between the air receiving element 42 and the décor attachment element 22, and to removably lock the filter component 38 to the base component 14.

The filter component 38 is thus easily twisted off of the base component 14 to be cleaned and/or replaced with a different filter component 38, without having to replace the base component 14. Other constructions include different types of releasable couplings between the filter component 38 and the base component 14 (e.g., snap-on, frictional, etc.), which also permit easy removal and attachment of the filter component 38 to the base component 14.

Figure 10:
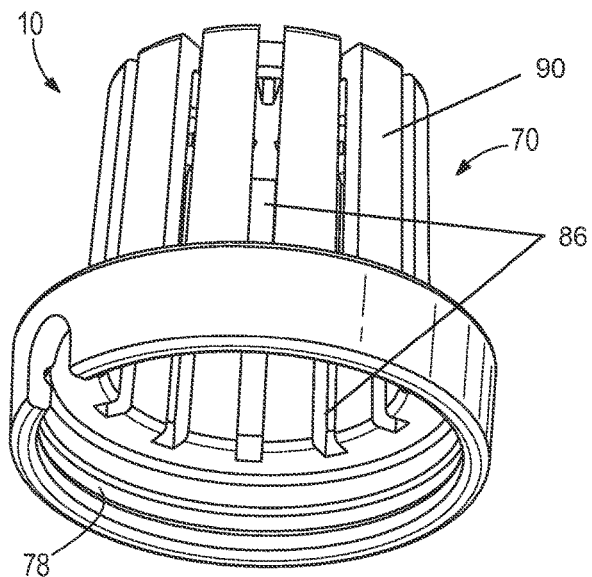
FIG. 10 is a perspective view of the air-powered filter, illustrating the filter housing.

With reference to FIGS. 1-3 and 7-10, the filter component 38 further includes a filter housing 70 coupled to the air receiving element 42 that receives the air that has entered the open cavity 54 (FIG. 4) of the air receiving element 42. As illustrated in FIG. 4, the air receiving element 42 includes an outer thread 74. As illustrated in FIG. 10, the filter housing 70 further includes an inner thread 78 that is configured to engage the outer thread 74 so as to releasably couple the filter housing 70 to the air receiving element 42. In some constructions the filter housing 70 is integrally formed as a single piece with the air receiving element 42. Other constructions include different structures for coupling the filter housing 70 to the air receiving element 42.

With continued reference to FIG. 7, the filter housing 70 includes a recess or notch 82 sized to receive the nozzle 50. With reference to FIGS. 2, 3, and 10, the filter housing 70 further includes a plurality of openings 86, some of which in the illustrated construction are elongated slits positioned around a side surface 90 of the filter housing 70, and some of which are openings disposed along a top surface 94 (FIG. 3) of the filter housing 70. The openings 86 provide escape for oxygen (e.g., in the form of oxygen or air bubbles) out of the filter housing 70 and into, for example, the surrounding water environment of an aquarium. In some constructions the filter housing 70 acts to filter water within the filter housing 70 and/or aquarium.

With reference to FIGS. 1, 2, and 7-9, the filter component 38 further includes an outer housing 98 that is coupled to the filter housing 70 (e.g., via a frictional fit, via further threads, or through other coupling structures). As illustrated in FIG. 2, the outer housing 98 covers at least a portion of the filter housing 70, while leaving at least a portion of the filter housing 70 (including at least a portion of the openings 86) exposed. For example, in the illustrated construction the outer housing 98 extends generally around the side surface 90, leaving the top surface 94 and its openings 86 exposed. In some constructions the outer housing is integrally formed as a single piece with the filter housing 70.

In one example of use, the base component 14 is first coupled to the surface 18, for example by pressing the suction cup 16 against the surface 18. If the décor attachment element 22 is not already coupled to the base component 14, the décor attachment element 22 is coupled over the top portion 30 of the base component 14 (e.g., by pressing the décor attachment element 22 down over the top portion 30 of the suction cup 16). The filter component 38 is then coupled to the base component 14 by twisting the air receiving element 42 of the filter component 38 onto the décor attachment element 22. If the filter housing 70 and the outer housing 98 are not already coupled to the air receiving element 42, the filter housing 70 is twisted onto the air receiving element 42. The outer housing 98 is also then coupled to the filter housing 70. Finally, the decorative feature 26 is coupled to the prongs 34.

Figure 11:
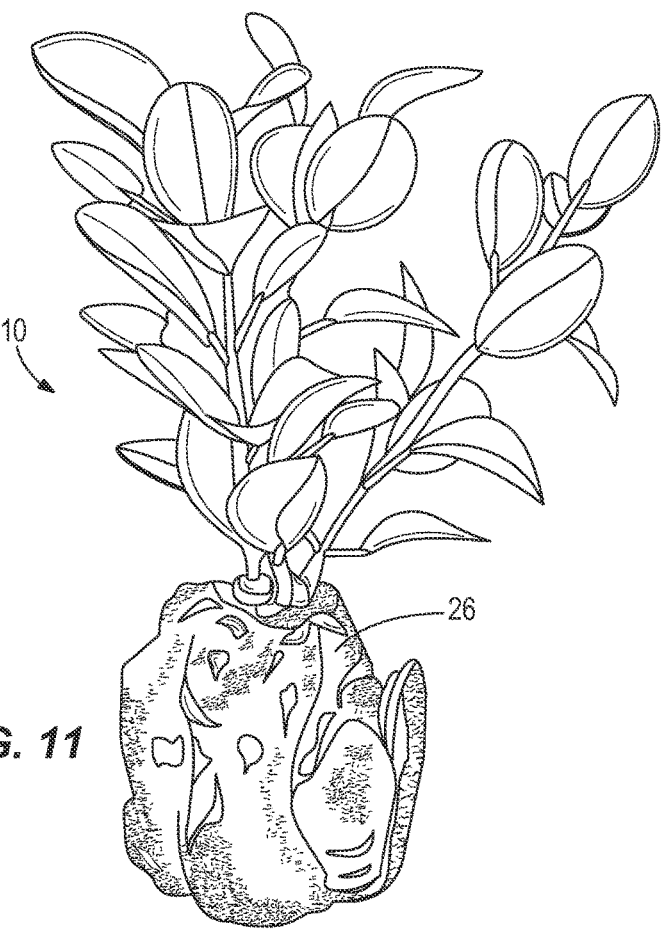
FIGS. 11-13 are perspective views of alternative decorative features.
Figure 12:
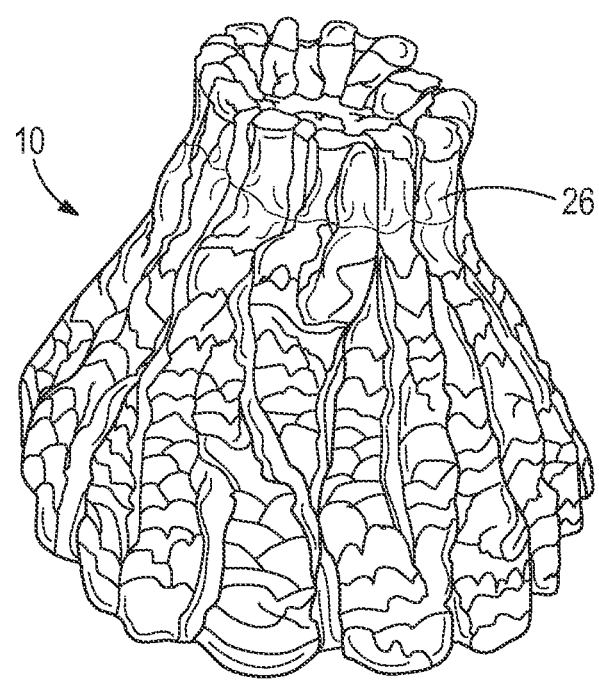
Figure 13:
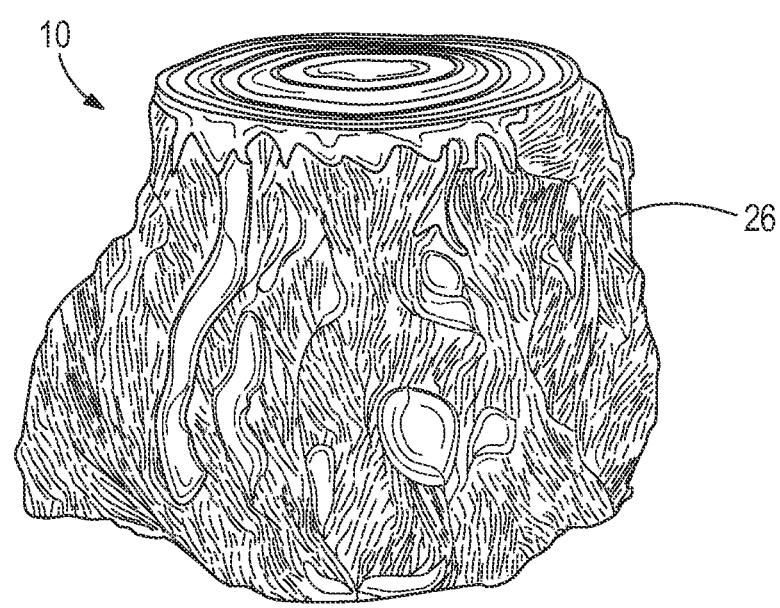

The decorative feature 26 helps to shield and disguise the rest of the air-powered filter 10, so that most of the air-powered filter 10 remains generally hidden. With reference to FIGS. 11-13, in some constructions the decorative feature 26 takes the form of a volcano, a rock, a tree stump, or other decorative structures, for example with air bubbles emanating from the volcano, rock, or tree stump. In some constructions more than one decorative structure is used. In some constructions at least one of the decorative features 26 is coupled to the rest of the air-powered filter 10 by simply lowering the decorative feature 26 over the rest of the air-powered filter 10, or by coupling the decorative feature to elements other than the air receiving element 42.

Although the invention has been described in detail with reference to certain preferred embodiments, variations and modifications exist within the scope and spirit of one or more independent aspects of the invention as described.

What is claimed is:

1. An air-powered filter for an aquarium comprising:
   a base component configured to be coupled to a surface of the aquarium, the base component including a suction cup;
   a filter component releasably coupled to the base component, the filter component including a filter housing having at least one opening; and
   a decorative feature coupled to the base component, the decorative feature configured to cover and disguise at least a portion of the air-powered filter;
   wherein the base component includes a décor attachment element coupled to the suction cup, wherein the suction cup includes a top portion, and wherein the décor attachment element includes an opening that is received over the top portion of the suction cup to couple the décor attachment element to the suction cup.

2. The air-powered filter of claim 1, wherein the décor attachment element includes at least one prong, and wherein the decorative feature is releasably coupled to the at least one prong.

3. The air-powered filter of claim 1, wherein the décor attachment element includes two, raised, axially extending projections that each form a channel configured to receive a portion of the filter component.

4. The air-powered filter of claim 1, wherein the filter component includes an air receiving element coupled to the filter housing, the air receiving element having a main body that defines a cavity, and a nozzle in fluid communication with the cavity, wherein the nozzle is configured to direct air from an air source into the main cavity.

5. The air-powered filter of claim 4, wherein the nozzle is a releasably coupled to the main body.

6. The air-powered filter of claim 4, wherein the main body includes an outer thread and the filter housing includes an inner thread that engages the outer thread.

7. The air-powered filter of claim 1, wherein the filter component includes an air receiving element coupled to the filter housing, wherein the air receiving element includes a nozzle to receive air from an air source, and wherein the air receiving element further includes two radially extending projections configured to engage with a portion of the base component.

8. The air-powered filter of claim 1, wherein the filter component further includes an outer housing coupled to the filter housing.

9. The air-powered filter of claim 8, wherein the outer housing leaves the at least one opening exposed so that oxygen may leave the filter component via one or more bubbles through the at least one opening.

10. The air-powered filter of claim 1, wherein the base component includes two, raised, axially extending projections that each form a channel, and wherein the filter component includes two radially extending projections configured to engage and disengage with the channels, so as to releasably couple the filter component to the base component.

11. The air-powered filter of claim 1, wherein the decorative feature is selected from a group consisting of a fake plant, a fake rock, and a fake volcano.

12. The air-powered filter of claim 1, wherein the decorative feature is releasably coupled to the base component.

13. The air-powered filter of claim 1, wherein the base component includes prongs that are releasably coupled to the decorative feature.

14. An air-powered filter for an aquarium comprising:
a base component configured to be coupled to a surface of the aquarium, the base component including:
a suction cup; and
a décor attachment element coupled to the suction cup, the décor attachment element including at least one prong configured to couple to a decorative feature; and
a filter component releasably coupled to the base component, the filter component including:
an air receiving element having a nozzle to receive air from an air source; and
a filter housing coupled to the air receiving element, the filter housing having at least one opening;
wherein the air-powered filter is arranged such that the suction cup is releasably coupled to the décor attachment element, the décor attachment element is releasably coupled to the air receiving element, and the air receiving element is releasably coupled to the filter housing, or such that the suction cup is integrally formed in one piece with the décor attachment element and the air receiving element is integrally formed in one piece with the filter housing.

15. The air-powered filter of claim 14, wherein the décor attachment element includes two, raised, axially extending projections that each form a channel.

16. The air-powered filter of claim 15, wherein the air receiving element includes two radially extending projections configured to engage and disengage with the channels.

17. The air-powered filter of claim 14, wherein the filter component includes an outer housing coupled to the filter housing.

18. An air-powered filter for an aquarium comprising:
a base component configured to be coupled to a surface of the aquarium, the base component including a suction cup;
a filter component releasably coupled to the base component, the filter component including a filter housing having at least one opening; and
a decorative feature coupled to the base component, the decorative feature configured to cover and disguise at least a portion of the air-powered filter;
wherein the filter component further includes an outer housing coupled to the filter housing.

19. The air-powered filter of claim 18, wherein the outer housing leaves the at least one opening exposed so that oxygen may leave the filter component via one or more bubbles through the at least one opening.

20. The air-powered filter of claim 18, wherein the base component includes prongs that are releasably coupled to the decorative feature.

* * * * *